Jan. 12, 1954   J. E. WHIPPLE   2,665,810
FLOW CONTROL FILTER ELEMENT
Filed Dec. 12, 1951
FIG. I
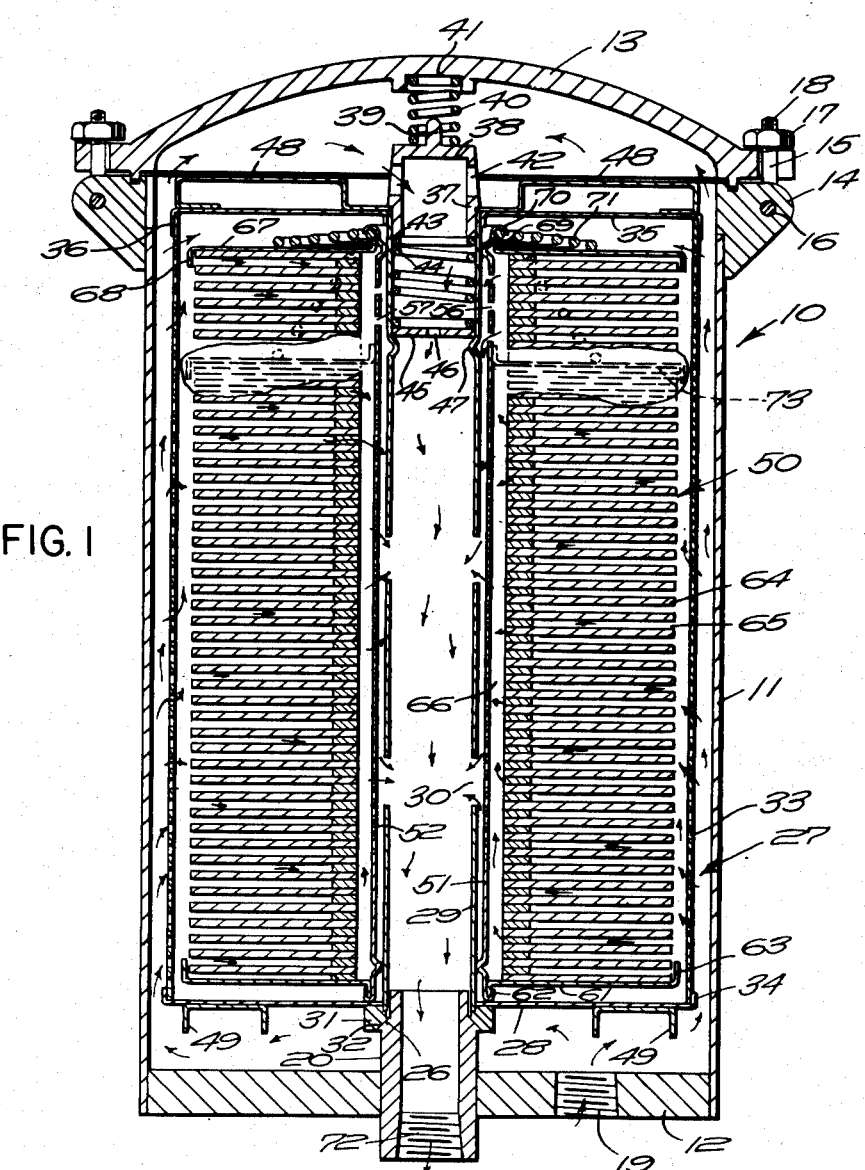
FIG. 2
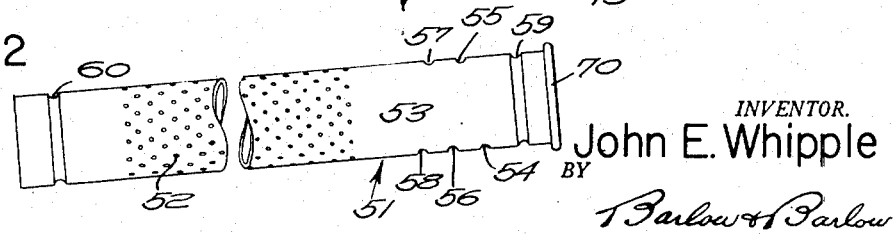
INVENTOR.
John E. Whipple
BY
Barlow & Barlow
ATTORNEYS Patented Jan. 12, 1954

2,665,810

UNITED STATES PATENT OFFICE 2,665,810

FLOW CONTROL FILTER ELEMENT

John E. Whipple, Rumford, R. I., assignor to Fram Corporation, a corporation of Rhode Island Application December 12, 1951, Serial No. 261,251

2 Claims. (Cl. 210—165)

This invention relates to a filter element of a cellulosic material more particularly, paper which contracts upon being contacted by the liquid filtrate which it serves, such as hot oil.

In the use of a filter element consisting of a stack of members formed of cellulosic material such as paper or cardboard, it is found that the element when subjected to the filtering of hot oil will axially contract and because of such contraction will reduce the flow of the filtered oil therethrough. In the construction of such filter, some rod or core is needed to hold the cardboard member in axial registry.

One of the objects of this invention is to provide an arrangement so that as the axial contraction in a cellulosic filter element occurs, there will be exposed openings which will permit the unfiltered liquid to bypass the filter element.

Another object of the invention is to cause the exposure of the openings by such contraction to be in proportion to the reduction of flow caused by the contraction of the filter element so that substantially the same flow of liquid under the same pressure will occur regardless of the contraction of the filter element.

Another object of the invention is to provide for this compensation or flow control in the filter element itself.

More specifically, an object of the invention is to provide a rigid core upon which the filter members are stacked with openings along one end portion of the core which are progressively exposed as contraction takes place.

Another object of the invention is to provide a stack of members without a rod or core to maintain these is axial aligned registry.

With these and other objects in view, the invention consists of certain novel features of construction, as will be more fully described and particularly pointed out in the appended claims.

In the accompanying drawings:

Fig. 1 is a sectional view of a filter embodying an element constructed in accordance with this invention;

Fig. 2 is a side elevation of the core of the filter element, showing the same perforated in a manner to accomplish the results of this invention.

With reference to the drawings, 10 designates generally a filter case comprising a cylindrical wall 11 with bottom wall 12 and a removable cover 13. The upper portion of the cylindrical casing 11 is provided with an annular ring 14 from which there extends upwardly bolts 15 pivoted as at 16 and provided with nuts 17 to engage a threaded portion 18 and hold the cover in position. The bottom wall 12 is provided with an entrance opening 19 which is threaded for suitable inlet connection thereto. Rising from this bottom wall, there is an outlet spud 20 which has a portion at its upper end reduced in its outer dimension so as to provide a beveled sealing seat 26 as a shoulder.

A cage designated generally 27 has a bottom wall 28 with a center tube 29 extending upwardly therefrom, which tube is provided with entrance openings 30 at various positions axially along its length. The center tube is joined to the bottom wall 28 by a collar 31 which is welded to the bottom wall and to the center tube, and which provides a beveled surface 32 which seats upon the beveled surface 26 so as to provide a seal therewith. The cage 27 has a perforated cylindrical wall 33 extending upwardly from within the flanges 34 of the bottom wall 28 and is attached to the top wall 35 by the top wall having flanges 36 to brace the same. This top wall is also secured to the upper end of the center tube 29 by the cylindrical member 37 being welded to the top wall 35 and also to the center tube and extending above both of these to provide a cap 38 with an upstanding projection 39 for centering a spring 40 which is received within the cup 41 of the cover. A diametrically extending hole 42 passes through this member 37. This member 37 also provides a shoulder 43 against which the upper end of spring 44 engages, which spring also engages the washer 45 perforated as at 46 in a size to govern the flow of liquid which is bypassed through the center tube. This disc or washer 45 may be changed to have different sized openings 46 therein as the viscosity of the liquid being filtered varies. This disc 45 engages the inwardly deflected shoulder 47 of the center tube 29 at its upper end. This whole cage which has just been above described is provided with handles 48 by which the cage may be lifted bodily from the casing 10 and feet 49 by which the casing may be set upon some support so that it will not rock about the collar 31.

Within the cage 27, I provide a filter element 50 which is the subject of this invention. This element comprises a rigid core 51 (see Fig. 2) which has a plurality of closely spaced fine perforations 52 along the lower portion of the core while the upper portion 53 of the core is largely of imperforate material but does have at selected spaces larger perforations as 54, 55, 56, 57 and 58, which are round holes of pre-determined diameter. The core is deflected inwardly as at 59 and 60 so as to limit and substantially prevent oil which has entered cage 27 from bypassing the filter element 50 between this core 51 and the center tube 29. Upon this core, there is assembled a bottom end plate 61 which is joined to the core 51 as at 62 by rolling the parts together while it is flanged at its periphery as at 63. Upon this core there are a plurality of members 64 stacked which members may take the form of the members shown in Pat. No. 2,501,582. These members are of a cellulosic material usually paper or cardboard and are stacked in such a manner as to provide contaminant receiving spaces 65 where the flow is from the outside inwardly as shown by the arrows in the drawing. An opening extending axially of the tube is provided at 66 between the stack and the core 51 so that the filtrate liquid may freely flow axially of the element. The members comprise a complete ring about this center opening so that the filtrate liquid must pass therethrough. At the upper end of this filter element, there is a top end plate 67 which is flanged as at 68 and is also flanged at its inner opening 69 providing a collar which will slide along the core 51. This core is also rolled as at 70 at its upper end to provide an abutment for one end of the spring 71 while the other end of the spring presses upon the top end plate 67.

The members 64 are axially compressed after assembly on the core 51 and the spring 71 assembled thereon and the abutment 70 rolled over while under such pressure. The pressure is such that the members cannot shift registry or get out of axial alignment and the spring 71 holds these members 64 under such pressure that they cannot get out of registry, thus making unnecessary the use of axial rods or a center core to hold the members in registry.

With this arrangement, as the cellulosic material in the stack of members contracts, the plate 67 will move downwardly under the influence of the spring so as to progressively expose the openings 54, then 55, then 56, then 57, then 58, so that a liquid which would ordinarily pass through the filter element or removable cartridge will partly pass through these openings as they are progressively exposed so as to cause the flow of the liquid to be maintained near the rate of flow which is initially provided, it being understood that as the contraction of the stack occurs, there will be some restriction in flow due to greater compression of the cellulosic members and the arrangement of the holes 54 and 56 is such as to size and arrangement that the initial flow is maintained even though such contraction does occur.

It will be understood that the flow in the filter is in to the filter at the opening 19 thence through the perforated wall 33 of the cage 27, inwardly through the filter element, by passing into the cells 65 through the filter element into the axial space 66 thence through the perforations 52 and along a center tube 29 through the openings 30 thereof and thence outwardly through the center 72 of the spud 20. A certain by pass of this flow will occur through the openings 42 and down through the opening 46 of the washer or disc 45. However, as the filter compresses axially and restriction occurs, the flow will then pass through the openings first 54, then 55, then 56 and then 57 and then 58, each adding flow to the others until when the element is compressed to the extent shown in dotted lines at 73, all of the openings will be exposed and flow will additionally occur through these openings in order to supplement the flow which occurs through the filter element and maintain the flow substantially at its initial rate of flow to the delivery point.

I claim:

1. A filter element comprising a tubular axially rigid core, a stack of members formed of shrinkable cellulose material about said core for radial filtration but spaced therefrom sufficiently to provide axial flow therealong, end plates at the ends of said stack to prevent axial flow along the core, resilient means to urge one of said plates relatively toward the other and slide a plate along its core as axial shrinkage of the stack of members occurs, said core being provided with openings spaced axially along the core which are progressively uncovered by sliding of an end plate along the core for bypassing liquid being filtered, said core being perforated in the zone where continually covered by the members for passage of liquid therethrough.

2. A filter element as in claim 1 wherein the bypass openings are so sized and arranged as to be opened by the stack shrinkage in proportion to the restriction in flow of the liquid through the stack so as to maintain substantially the initial flow through the element regardless of axial shrinkage.

JOHN E. WHIPPLE.

References Cited in the file of this patent

UNITED STATES PATENTS

| Number | Name | Date |
|---|---|---|
| 2,079,365 | Thomas | May 4, 1937 |
| 2,455,486 | Hicks | Dec. 7, 1948 |
| 2,462,488 | Gunn | Feb. 22, 1949 |
| 2,582,272 | Pamp | Jan. 15, 1952 |
| 2,604,994 | Vocelka | July 29, 1952 |